Patented July 6, 1926.

1,591,267

UNITED STATES PATENT OFFICE.

SIDNEY BAKEWELL, OF DETROIT, MICHIGAN, ASSIGNOR, BY MESNE ASSIGNMENTS, TO LELAND LOCK COMPANY, OF DETROIT, MICHIGAN, A CORPORATION OF MICHIGAN.

STEERING WHEEL.

Application filed April 21, 1923. Serial No. 633,581.

This invention relates to steering wheels for automobiles, motor boats, aeroplanes and the like, and more particularly to steering wheels that are movable from their usual operative positions to positions affording greater convenience of ingress and egress to and from the driver's seat.

Among the objects of my invention are the provision of a simple and efficient steering wheel readily secured upon the steering columns of vehicles of various makes; the mounting of the steering wheel to permit its being tilted on an axis eccentric to that of the wheel and then swung laterally to further remove it from the path of the driver in entering and leaving the vehicle, and the arrangement of the wheel mounting in conjunction with one member of a locking device, whereby the steering mechanism may be locked at will with the wheel in either its normal or tilted positions.

The above and other objects of my invention will be apparent from the following description wherein reference is made to the accompanying drawings illustrating a preferred embodiment of my invention, and wherein similar reference numerals designate similar parts throughout the several views.

In the drawings:—

Fig. 4 is a detail view of the steering block and associated rotative member, with the grooved pintle on which the rotative member fulcrums shown in dotted lines, and Fig. 5 is a detail view showing the horizontal swivel bolt on which the wheel tilts, and its relation to the grooved pintle on which the wheel rotates.

Figure 1:
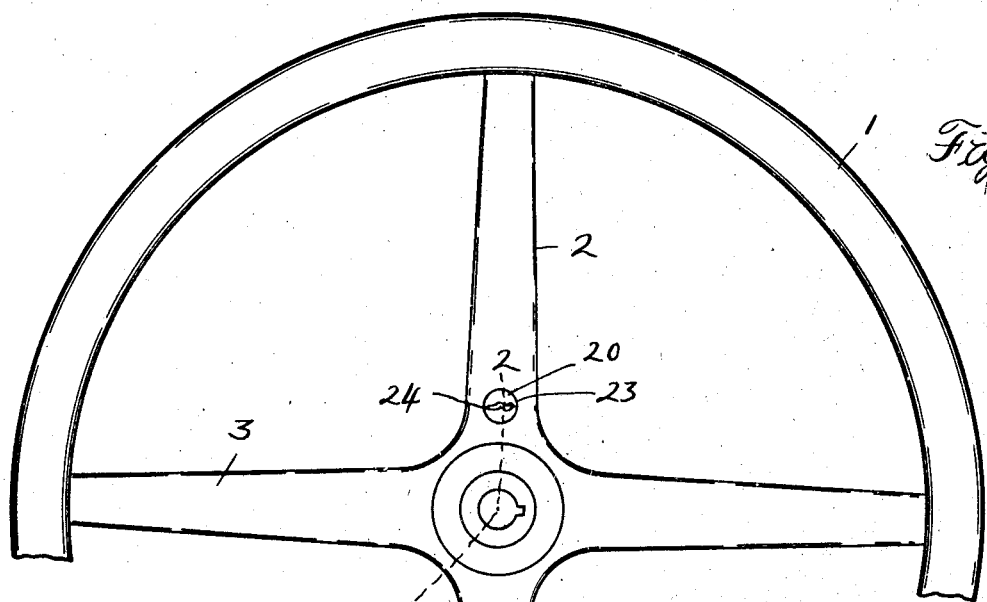
Fig. 1 is a plan view of the steering wheel, shown in full lines in its normal position and in dotted lines in its tilted position.

Referring now to the drawings the numeral 5 designates a steering wheel having a spider portion 6 formed with an elongated opening adjacent its hub portion and carrying apertured ears 8 adjacent the rear extremity of the cut-out portion. A steering block 9 of substantially the same shape and area as the cut-out portion is adapted to be keyed upon, or otherwise secured upon the upper end of the steering column 10 to which it is locked by means of nuts 11. A pintle 12 is threaded, or otherwise secured, in the rear face of the steering block 9 (see Fig. 4) and projects therefrom, extending through a central aperture 13 in the rotative member 14. The rotative member 14 is also provided with a transverse aperture 15 for the reception of the swivel bolt 16 adapted to pass through the ears 8 of the wheel spider and the rotative member 14, as best illustrated in Figs. 1 and 5. Suitable lock nuts 17 may be provided to retain the swivel bolt in position.

In assembling my steering wheel upon the steering column of an automobile or the like, the steering block 9 is firmly secured upon the steering column, or the movable stub shaft of the steering mechanism in the Ford and similar constructions, the rotative member 14 then secured upon the pintle 12 and locked in such position by suitable means, as for example, by a spring-pressed ball 18 fitting within a notch 19 in the pintle (see Fig. 5), and then the spider portion of the wheel secured upon the rotative member 14 by means of the swivel bolt 16 passing through the ears 8 of the spider and the rotative member. As best illustrated in Fig. 4, the pintle 12 is provided with an annular groove 20 arranged so that the swivel bolt 16 fits within the annular groove when the wheel is assembled. This serves to aid in preventing unwarranted removal of the pintle 12.

Figure 2:
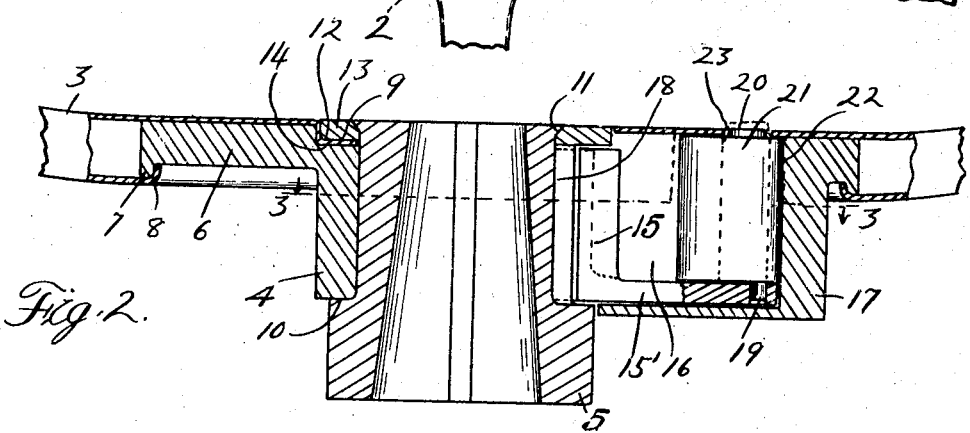
Fig. 2 is a side elevation of the steering wheel likewise showing the normal and tilted positions assumed by the wheel.
Figure 3:
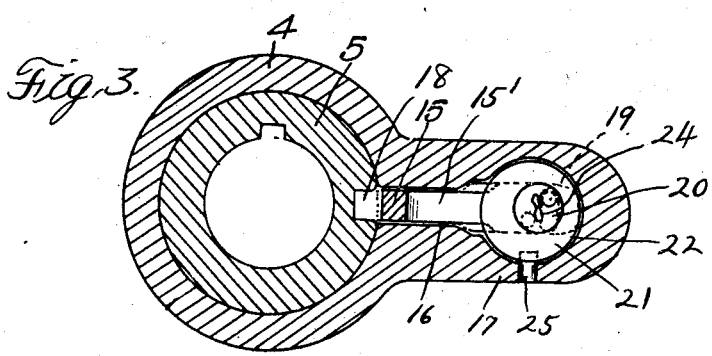
Fig. 3 is a diagrammatic view illustrating the rotative movement of the wheel while being swung from its intermediate raised position to the tilted position shown in dotted lines in Figs. 1 and 2.

In operation the steering wheel is normally maintained in the position shown in full lines in Figs. 1 and 2, the cut-out portion of the spider fitting snugly over the steering block 9 secured to the steering mechanism, being removably locked in this position by means of the spring-pressed latch 21 carried by the spider and fitting into an opening 22 in the steering block. With the wheel in this position the car can be steered in the usual manner, the rotation of the wheel serving to turn the steering block 9 and the steering mechanism secured thereto. The latch 21 prevents accidental dislocation of the steering wheel from the July 6, 1926.

C. W. BECK

STEERING WHEEL

Filed April 21, 1924

1,591,268

Inventor
Charles W. Beck

By Whittemore Hulbert Whittemore
+Belknap         Attorneys